(12) United States Patent
Chang et al.

(10) Patent No.: US 8,109,830 B2
(45) Date of Patent: Feb. 7, 2012

(54) DRIVING SIMULATION DEVICE FOR EXECUTING A SIMULATING GAME

(75) Inventors: Li-Hsien Chang, Taipei County (TW); Chi-Shian Wang, Taipei County (TW)

(73) Assignee: International Games System Co., Ltd., Taipei County (TW)

( * ) Notice: Subject to any disclaimer, the term of this patent is extended or adjusted under 35 U.S.C. 154(b) by 806 days.

(21) Appl. No.: 12/235,829

(22) Filed: Sep. 23, 2008

(65) Prior Publication Data

US 2009/0286602 A1    Nov. 19, 2009

(30) Foreign Application Priority Data

May 14, 2008    (TW) ................................ 97208376 U

(51) Int. Cl.
*A63F 9/00* (2006.01)
*G09B 9/04* (2006.01)
(52) U.S. Cl. ............................................. 463/37; 434/61
(58) Field of Classification Search .................... 482/57; 434/61, 62, 69; 463/37; 273/148 B; 446/440
See application file for complete search history.

(56) References Cited

U.S. PATENT DOCUMENTS

| | | | | |
|---|---|---|---|---|
| 3,686,776 | A | * | 8/1972 | Dahl .............................. 434/61 |
| 5,415,550 | A | * | 5/1995 | Aoki et al. ...................... 434/61 |
| 5,533,899 | A | * | 7/1996 | Young ............................ 434/61 |
| 5,547,382 | A | * | 8/1996 | Yamasaki et al. ............... 434/61 |
| 6,030,223 | A | * | 2/2000 | Sugimori ........................ 434/61 |
| 6,234,800 | B1 | * | 5/2001 | Koyama et al. ................. 434/61 |
| 6,409,596 | B1 | * | 6/2002 | Hayashida et al. ............. 463/31 |
| 6,609,912 | B1 | * | 8/2003 | Harashima et al. ............. 434/61 |
| 6,764,310 | B1 | * | 7/2004 | Ichihashi et al. ............... 434/61 |

* cited by examiner

*Primary Examiner* — Melba Bumgarner
*Assistant Examiner* — Seng H Lim
(74) *Attorney, Agent, or Firm* — Rosenberg, Klein & Lee

(57) ABSTRACT

A driving simulation device for executing a simulating game includes a mounting frame and a seat body. The seat body has a coupling portion and a seating portion located above the coupling portion. The seat body further includes first and second connecting rods having at least two fixing parts journaled to the mounting frame, two swinging parts journaled to the coupling portion of the seat body and two coupling parts interconnecting the fixing parts and the swinging parts and transversely crossing each other. Once a rider is seated on the seating portion and swings the seat body so as to simulate a driving action, the seating portion and the coupling portion swing respectively in two directions opposite to each other, and thereby a swinging center of the seat body can fall between the coupling portion and the seating portion.

7 Claims, 7 Drawing Sheets

DRIVING SIMULATION DEVICE FOR EXECUTING A SIMULATING GAME

This application claims the benefit of Taiwan Patent Application Serial No. 097208376, filed May 14, 2008, the subject matter of which is incorporated herein by reference.

FIELD OF THE INVENTION

The invention relates to a game device, more particularly to a driving simulation device for executing a simulating game, in which a swinging mechanism is utilized in such a manner that, when a rider simulates a driving action by swinging a seat body, the swinging axis of the seat body is located at the center of the seat body, and thereby an applied force for swinging the seat body can be minimized.

BACKGROUND OF THE INVENTION

A conventional driving simulation device permits a player to simulate a real driving action. For instance, a motorcycle simulator includes a motorcycle-like apparatus to be driven by a rider so as to generate an operating signal that is transmitted to a processor for processing the signal in such a manner that a response thereof to the operating signal is displayed in a display device.

Referring to FIG. 1, a game device for a motorcycle simulator 60 is shown to include a driver seat 61, a coupler shaft 62 and a mounting frame 63. The driver seat 61 is fixed on the coupler shaft 62, which, in turn, is journaled to the mounting frame 63. The coupler shaft 62 extends along a rotating axis B so that, during simulating the driving operation, the rider can swing the driver seat 61 about the rotating axis B. The swinging action of the driver seat 61 is achieved by changing the gravity center of the rider's body relative to the mounting frame 63.

Since there is only a single rotating axis B in the aforesaid motorcycle simulator 60 and in case the driver seat 61 is swung to a relatively large angle during simulating a turning action, the rider must use his leg to prevent the driver seat 61 from falling to an inclined position, and such a manipulation un-stabilizes the driver seat 61. Since the entire weight of the driver seat 61 and the rider is sustained by the coupler shaft 62, the motorcycle simulator 60 is susceptible to damage easily. In case the driver seat 61 is at an inclined position, the rider must apply a tremendously large force to erect the driver seat 61 back to its normal position from the inclined position, since the rotating axis B is located below the driver seat 61. Moreover, due that there is no position restoration mechanism to assist the driver seat 61 to retrieve its initial position, the rider must use his/her body to maintain the desired stability of the driver seat 61, and such a move discomforts the rider.

SUMMARY OF THE INVENTION

The object of the present invention is to provide a driving simulation device for executing a simulating game, which includes a seat body such that the rotating axis of the seat body is located at the center of the seat body, and thereby an applied force for swinging the seat body about the rotating axis can be minimized. Since two connecting rods are used, the present driving simulation device possesses a relatively large strength to support a rider thereon.

The driving simulation device for executing a simulating game according to the present invention includes a mounting frame and a seat body. The seat body has a coupling portion and a seating portion located above the coupling portion. The seat body further includes a connecting rod having a fixing part extending along a first axis and journaled to the mounting frame, a swinging part extending along a second axis and journaled to the coupling portion of the seat body, and a coupling part interconnecting the fixing part and the swinging part. Once a rider is seated on the seating portion and swings the seat body so as to simulate a driving action, the seating portion and the coupling portion swing respectively in two directions opposite to each other. The mounting frame further includes a spring member interconnecting the coupling portion and the mounting frame in such a manner to provide a push force for pushing the seat body (hence the coupling portion) back to its initial position upon removal of an applied swinging force therefrom.

The driving simulation device of the present invention provides the following advantages.

1. Two connecting rods are used in the driving simulation device of the present invention and thus provide two rotating axes (the first and second axes). So long as the gravity center of the rider does not exceed the boundary defined by the rotating axes, the driving simulator (hence the seat body) will not overturn, and thereby provides a more stable state than the conventional ones having a single rotating axis.

2. The rotating axes of the seat body is located at the center of the seat body so that the rider can minimize the applied swinging force for swing the seat body relative to the mounting frame.

3. The weight of the rider as well as the seat body are distributed uniformly on the first and second connecting rods, the driving simulation device of the present invention possesses a relatively large support force to support the driving simulator since the conventional ones has a single connecting rod.

4. The spring member interconnecting the coupling portion and the mounting frame provides a push force for pushing the seat body (hence the coupling portion) back to its initial position, and thereby the user can minimize an applied swinging force for swinging the seat body relative to the mounting frame.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
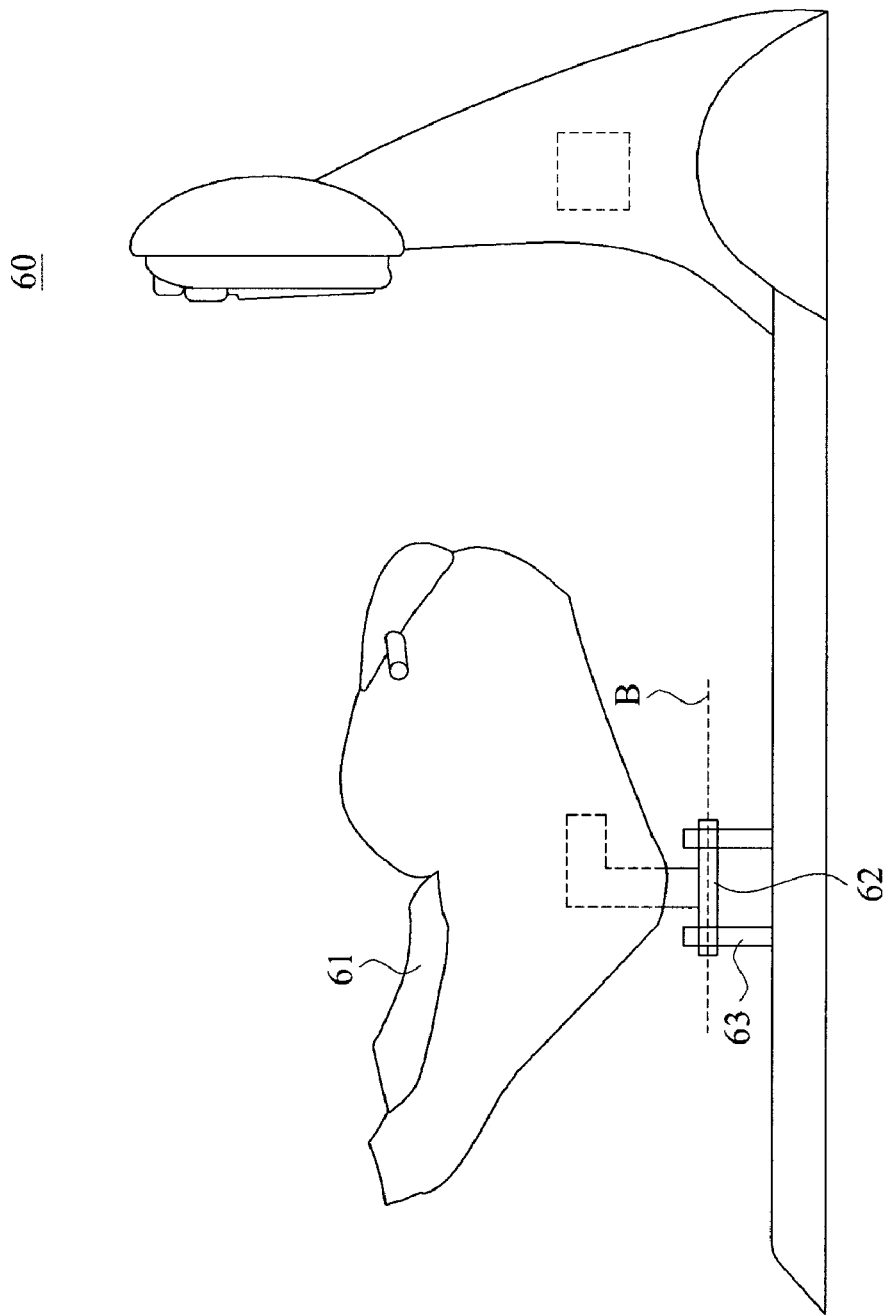
FIG. 1 is a side view of a conventional motorcycle simulator.
Figure 2:
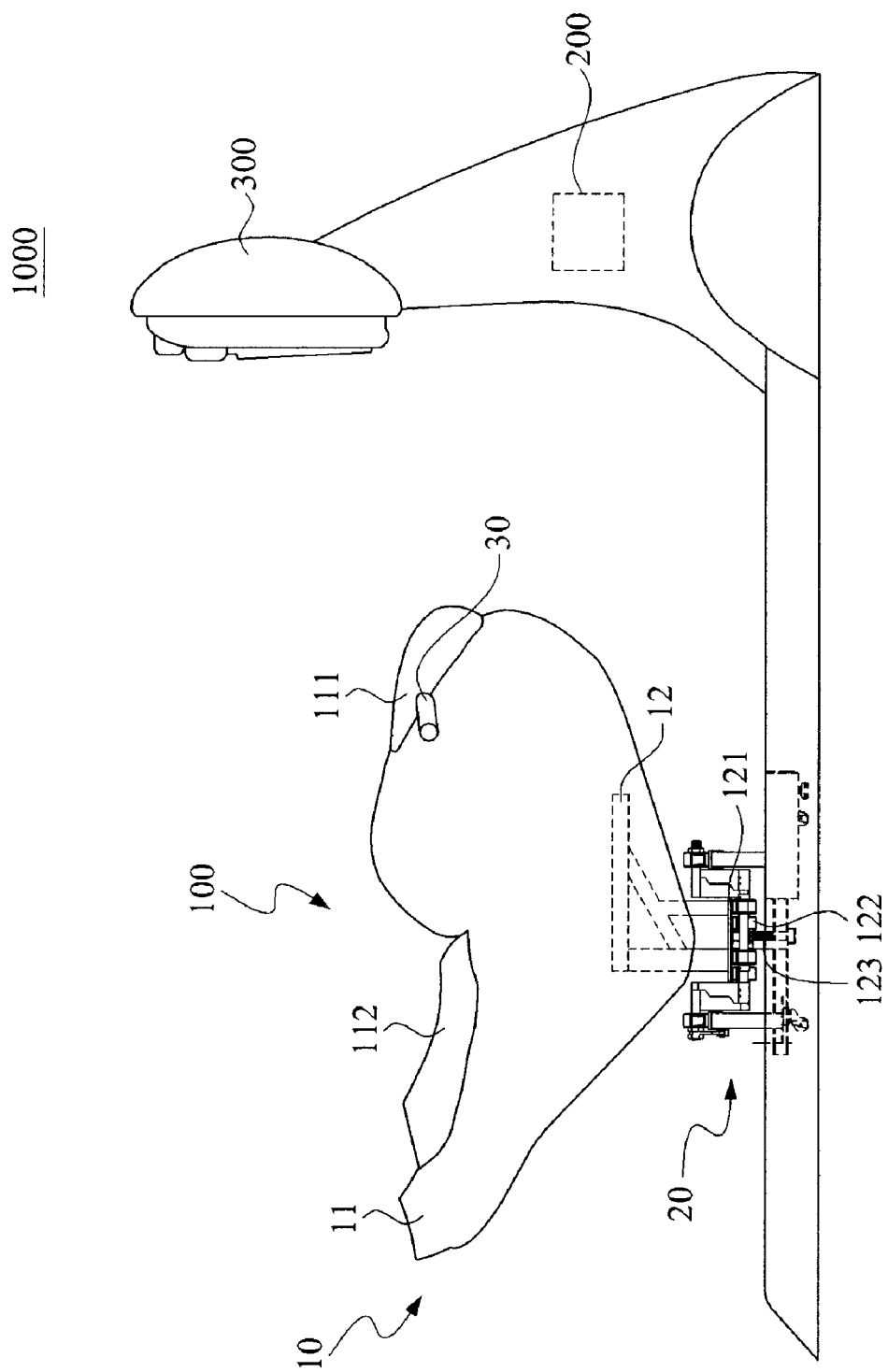
FIG. 2 is a side view of a driving simulation device for executing a simulating game of the present invention.
Figure 3:
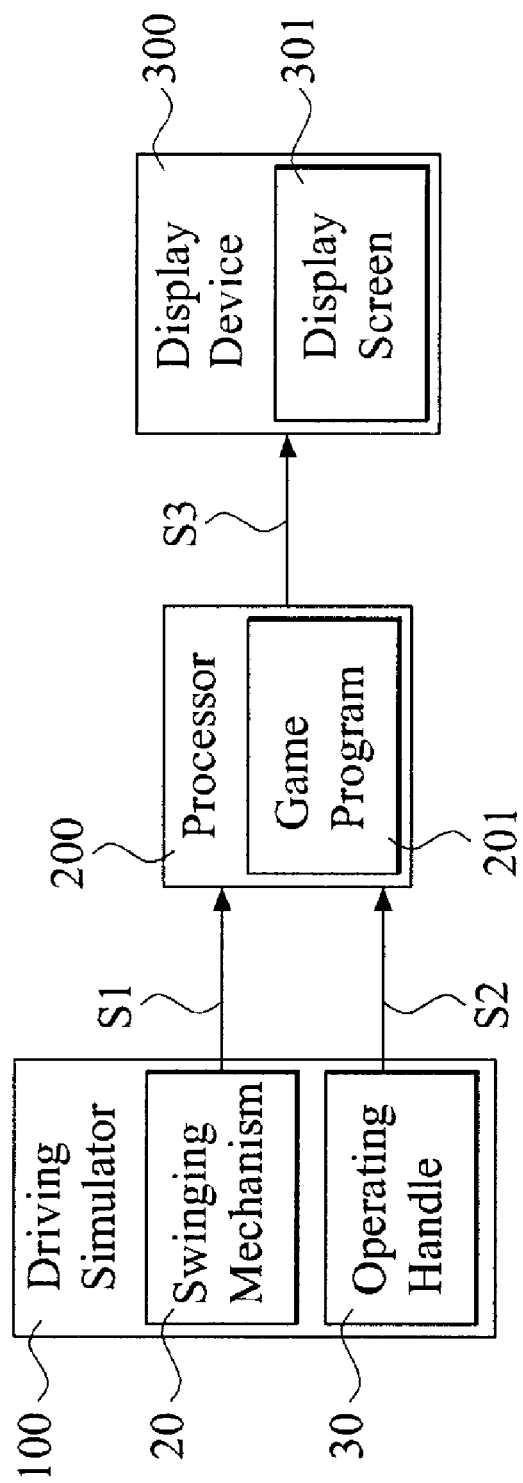
FIG. 3 shows a block diagram illustrating components constituting the driving simulation device of the present invention.

Referring to FIGS. 2 and 3, wherein FIG. 2 is a side view of a driving simulation device for executing a simulating game 1000 of the present invention and FIG. 3 shows a block diagram illustrating components constituting the driving simulation device 1000 of the present invention. The driving simulation device 1000 accordingly includes a driving simulator 100, a processor 200 and a display device 300.

The driving simulator 100 is used for simulating a motorcycle driving action, and permits seating of a rider thereon. Any swinging action of the rider's body results in swinging of the driving simulator 100.

The driving simulator 100 includes a seat body 10, a swinging mechanism 20 and an operating handle 30. The seat body 10 includes an outer shell 11 and a carrier frame 12. The outer shell 11 may have a profile of the motorcycle or any other structure depending on the purpose of the simulation device. The outer shell 11 has a seating portion 112 and a driving portion 111 disposed frontwardly of the seating portion 112 so as to be proximate to the display device 300. The seating portion 112 is provided to permit seating of the rider (not shown). The operating handle 30 is attached to the driving portion 111 so as to permit the rider to grip thereon for simulating a driving action. The carrier frame 12 is located within the outer shell 11 so as to support the outer shell 11, and has a coupling portion 121 located right below the seating portion 112. The coupling portion 121 is provided with a plurality of bearing units 122 and a stop member 123 for coupling with the swinging mechanism 20.

The swinging mechanism 20 is associated with the carrier frame 12 for swinging the seat body 10. The swinging mechanism 20 is connected to the processor 200, and is adapted to generate a swinging signal S1 (see FIG. 3) that is transmitted to the processor 200 for undergoing a procession.

The operating handle 30 is attached to the driving portion 111 of the seat body 10, is exposed exterior to the outer shell 11 so as to permit the rider to grip thereon for simulating a driving action. The operating handle 30 mimics a motorcycle handle such that, when the rider operates the handle 30 or swings the outer shell 11, an operation signal S2 is generated and transmitted to the processor 200 for undergoing a procession.

The processor 200 is electrically connected to the swinging mechanism 20, the operating handle 30 and the display device 300. The processor 200 is adapted to process a game program 201, and processes the swinging signal S1 and the operating signal S2 in such a manner that the response or the display signal S3 (see FIG. 3) is displayed in a display screen 301 of the display device 300.

As shown, the display device 300 is electrically connected to the processor 200.

Figure 4:
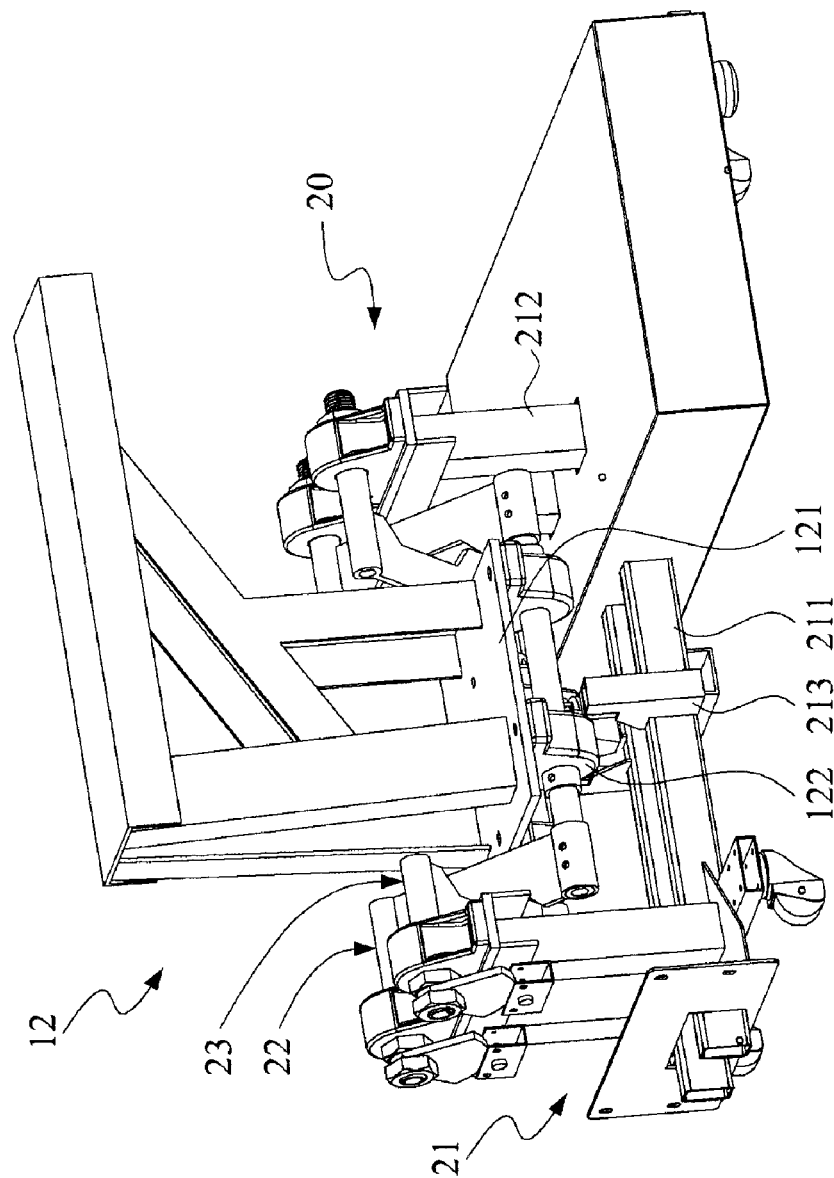
FIG. 4 is a perspective view of a swinging mechanism and a carrier frame employed in the driving simulation device of the present invention.
Figure 5:
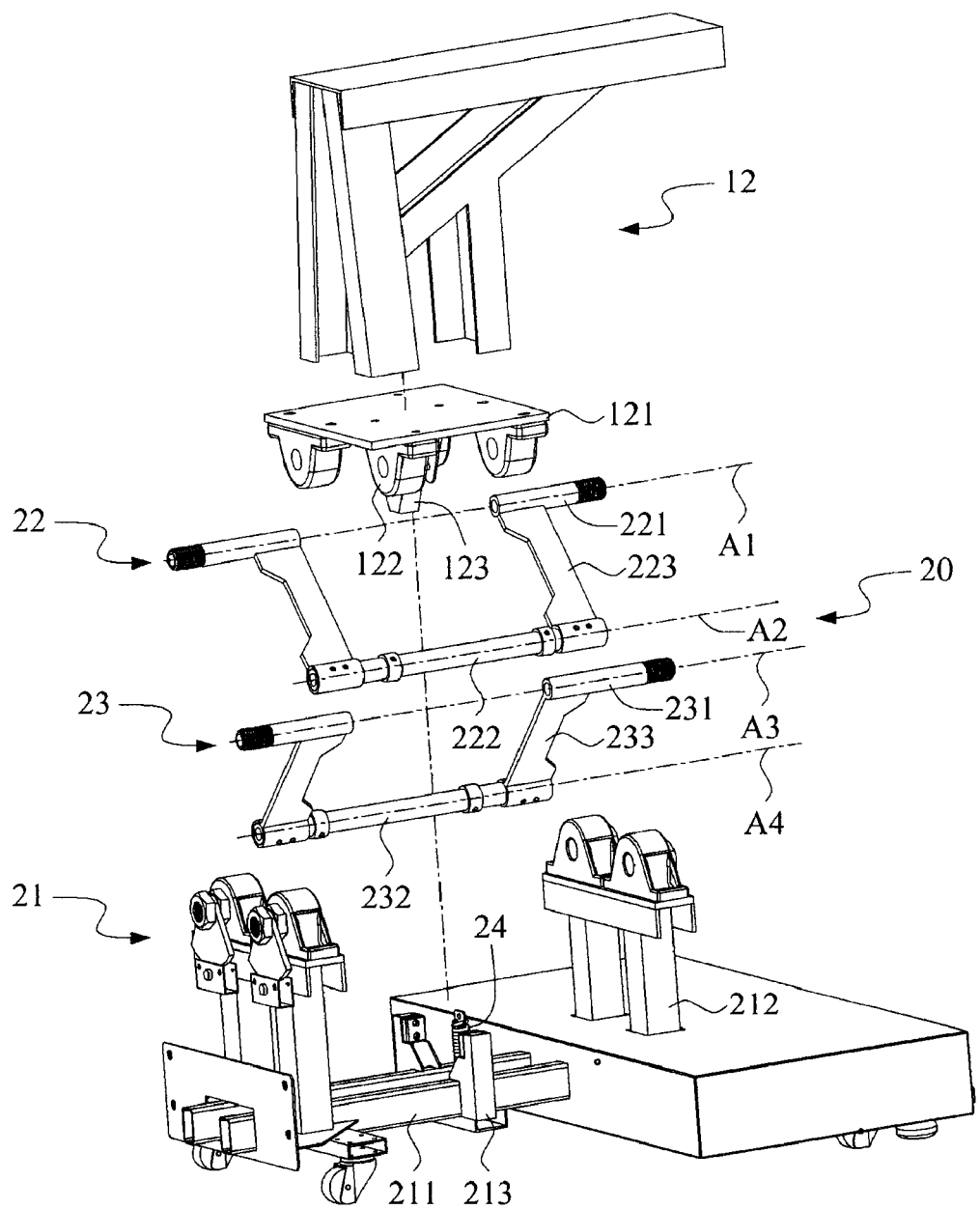
FIG. 5 is an exploded view of the swinging mechanism and the carrier frame shown in FIG. 4.

Referring to FIGS. 4 and 5, wherein FIG. 4 is a perspective view of the swinging mechanism 20 and the carrier frame 12 of the present invention while FIG. 5 is an exploded view of the swinging mechanism 20 and the carrier frame 12 shown in FIG. 4. As illustrated, the swinging mechanism 20 includes a mounting frame 21, a first connecting rod 22, a second connecting rod 23 and a spring member 24. The mounting frame 21 includes a mounting base 211 and a plurality of mounting posts 212 fixed erectly on the mounting base 211. The mounting frame 21 further includes a stop member 213 for stopping the coupling portion 121 in case the coupling portion 121 is swung to the largest swinging angle. The mounting frame 21 further includes a spring member 24 interconnecting the coupling portion 121 and the mounting base 211 in such a manner to provide a push force for pushing the seat body 10 (hence the coupling portion 121) back to its initial position upon removal of an applied swinging force therefrom.

The first and second connecting rods 22, 23 respectively may have identical structures (such as U-shaped structures) or structures different from each other. In this embodiment, the first connecting rod 22 has a first fixing part 221 extending along a first axis A1 and journaled to the top end of a respective mounting post 212, a first swinging part 222 extending along a second axis A2 and journaled to a respective bearing unit 122 in the coupling portion 121 and a first coupling part 223 interconnecting the first fixing part 221 and the first swinging part 222.

The second connecting rod 23 has a second fixing part 231 extending along a third axis A3 and journaled to the top end of a respective mounting post 212, a second swinging part 232 extending along a fourth axis A4 and journaled to a respective bearing unit 122 in the coupling portion 121, and a second coupling part 233 interconnecting the second fixing part 231 and the second swinging part 232.

Note that the first, second, third and fourth axes A1, A2, A3 and A4 are parallel to one another. After assembly, the first and second coupling parts 223, 233 of the first and second connecting rods 22, 23 transversely cross each other (see FIG. 6).

Moreover, in this embodiment, if only the first or second connecting rod 22, 23 is used, the swinging of the seat body 10 relative to the mounting frame 21 can still be achieved. Thus, such modification is encompassed within the spirit of the present invention.

Figure 6:
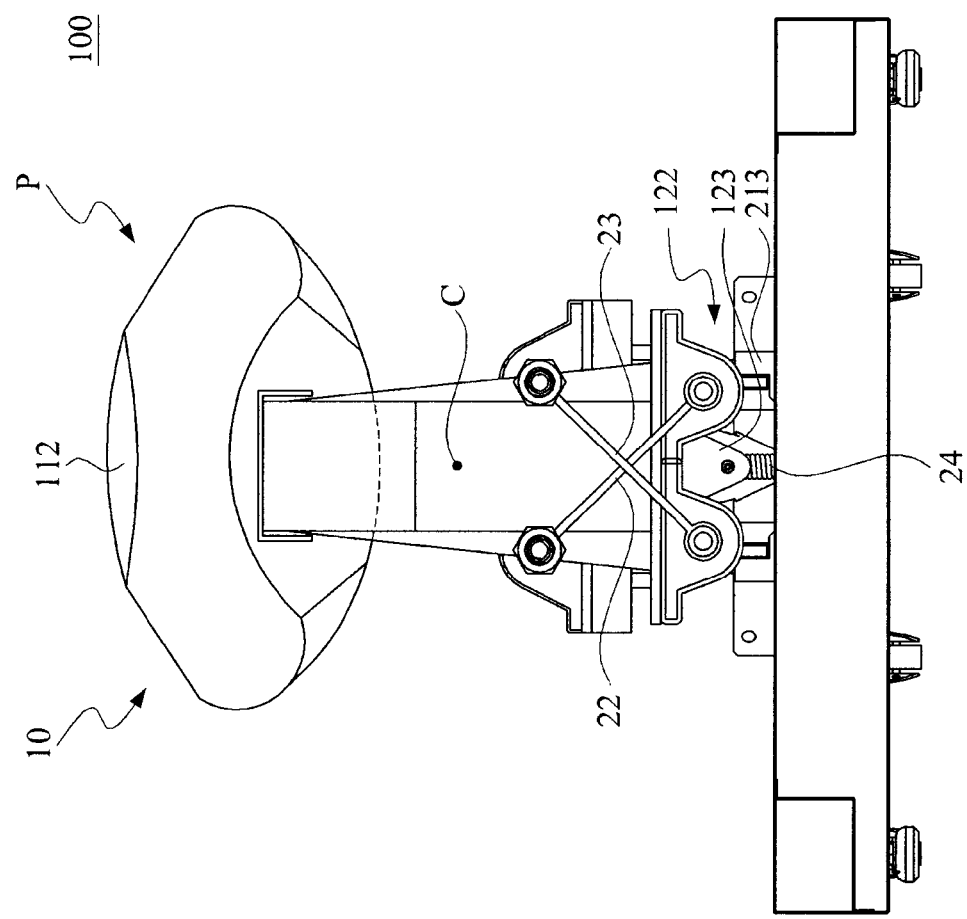
FIG. 6 illustrates the driving simulation device of the present invention at its initial position.
Figure 7:
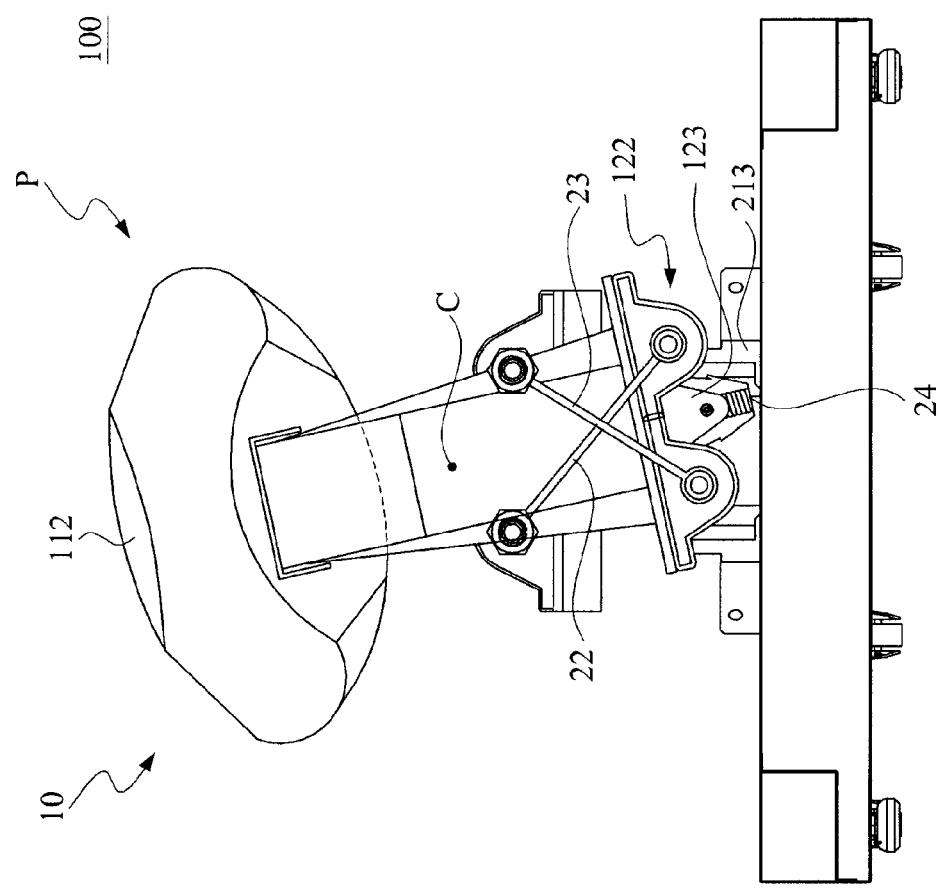
FIG. 7 illustrates the driving simulation device of the present invention in action.

Referring to FIGS. 6 and 7, wherein FIG. 6 illustrates the seat body 10 of the driving simulation device of the present invention at its initial position P and FIG. 7 illustrates the driving simulation device of the present invention in action. Once a rider is seated on the seating portion 112 and swings the seat body 10 so as to simulate a driving action, the seating portion 112 and the coupling portion 121 swing respectively in two directions opposite to each other.

As shown in FIG. 6, the seat body 10 is at its initial position P, where the spring member 24 interconnecting the coupling portion 121 and the mounting base 211 provides a push force for retaining the seat body 10 (hence the coupling portion 121) at the initial position P such that the stop member 123 of the coupling portion 121 is spaced apart from the stop member 213 of the mounting base 211. When the rider (not shown) seated on the seating portion 112 swings the seat body 10 to one side of the mounting frame 21, the coupling portion 121 is swung to another side of the mounting frame 21 opposite to the seating portion 112 due to the structuring of the first and second connecting rods 22, 23. Namely, the swinging axis "C" of the seat body 10 is located at the center of the seat body 10 so as to minimize the force for swinging the seat body 10 reciprocally. In case the seat body 10 is swung to its largest swinging angle, the stop member 213 of the mounting base 211 will collide against the stop member 123 of the coupling portion 121 so as to limit a swinging range of the seat body 10. Namely, the rider can be thereby prevented from falling from the seating portion 112. When the seat body 10 is swung to the largest swinging angle, the spring member 24 provides a push force for pushing the seat body 10 back to its initial position P upon removal of the applied swinging force therefrom.

To summarize the above paragraphs, since two connecting rods 22, 23 are used in the driving simulation device of the present invention, there needs two rotating axes (axes A1 and A2) such that, so far as the gravity center of the rider during the swinging action does not go beyond the boundary defined by the rotating axes, the driving simulator 100 will not overturn (hence the seat body 10), and thereby a more stable sate of the seat body 10 can be provided (by compared to the conventional driving simulator including only a single rotating axis). Moreover, since the weight of the rider as well as the seat body 10 are distributed uniformly on the first and second connecting rods 22, 23, the driving simulation device of the present invention possesses a relatively large support force to support the driving simulator 100 (Noted that the conventional one has a single connecting rod unit).

The stop member 123 of the seat body 10 can prevent overturning of the seat body 10 and is further connected the spring member 24 in such a manner that, when the seat body 10 is swung to an inclined position, the spring member 34 exerts a push force for pushing the seat body 10 back to its initial position P. Therefore, the rider can minimize the applied swinging force for swinging the seat body 10 relative to the mounting frame 21.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A driving simulation device for executing a simulating game, comprising:
   a display device electrically connected to a processor, wherein the processor is adapted to process a game program;
   a mounting frame; and
   a seat body having a coupling portion and a seating portion located above said coupling portion, said seat body further including:
   a first connecting rod having a first fixing part extending along a first axis and journaled to said mounting frame,
   a first swinging part extending along a second axis and journaled to said coupling portion of said seat body, and
   a first coupling part interconnecting said first fixing part and said first swinging part;
   a second connecting rod having a second fixing part extending along a third axis and journaled to said mounting frame,
   a second swinging part extending along a fourth axis and journaled to said coupling portion of said seat body, and
   a second coupling part interconnecting said second fixing part and said second swinging part,
   wherein said first and second coupling parts of said first and second connecting rods are transverse to each other,
   wherein, once a rider is seated on said seating portion and swings said seat body so as to simulate a driving action, said seating portion and said coupling portion swing respectively in two directions opposite to each other;
   wherein, the driving action is transmitted to the processor for executing the simulating game.

2. The driving simulation device according to claim 1, wherein said first and second axes are parallel to each other.

3. The driving simulation device according to claim 1, wherein said mounting frame includes a mounting base and a plurality of mounting posts fixed erectly on said mounting base, said first fixing part being journaled to a top end of a respective one of said mounting posts.

4. The driving simulation device according to claim 1, wherein said mounting frame includes a stop member for stopping said coupling portion in case said coupling portion is swung to a largest swinging angle.

5. The driving simulation device according to claim 1, further comprising a spring member interconnecting said coupling portion and said mounting frame in such a manner to provide a pushing force for pushing said seat body back to its initial position upon removal of an applied swinging force therefrom.

6. The driving simulation device according to claim 1, wherein said first, second, third and fourth axes are parallel to one another.

7. The driving simulation device according to claim 1, wherein said mounting frame includes a mounting base and a plurality of mounting posts fixed erectly on said mounting base, said first fixing part and said second fixing part being journaled to respective top ends of said mounting posts.

* * * * *